A. N. ARMSTRONG.
STALK CUTTER.
No. 244,728.  Patented July 26, 1881.
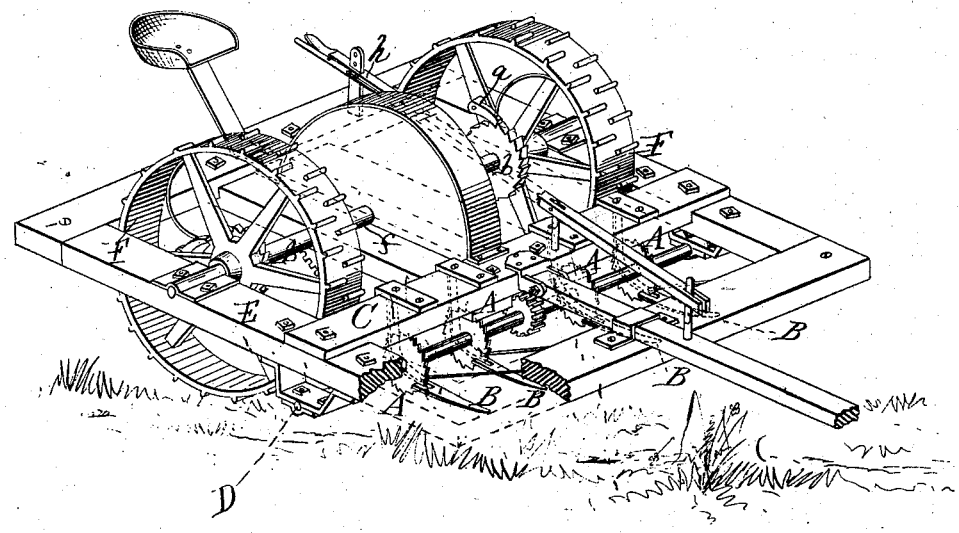
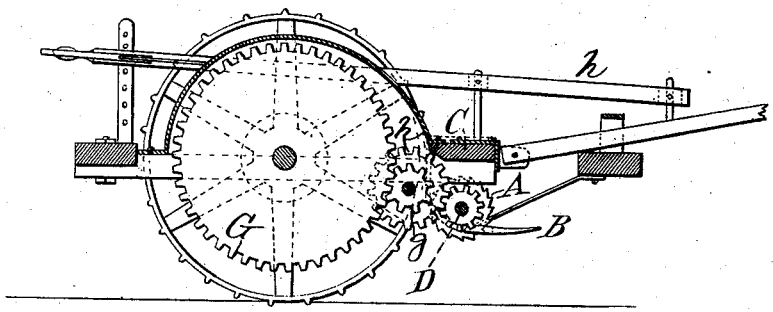
Witnesses:
James M. Scott
John Frazier
Inventor.
Andrew N. Armstrong

UNITED STATES PATENT OFFICE.

ANDREW N. ARMSTRONG, OF BLUE MOUND, ASSIGNOR OF ONE-HALF TO JOHN TRAINER, OF DECATUR, ILLINOIS.

STALK-CUTTER.

SPECIFICATION forming part of Letters Patent No. 244,728, dated July 26, 1881.

Application filed October 30, 1879.

*To all whom it may concern:*

Be it known that I, ANDREW N. ARMSTRONG, of Blue Mound, in the county of Macon and State of Illinois, have invented certain new and useful Improvements in Stalk-Cutters; and I do hereby declare the following to be a full, clear, and exact description of the same, reference being made to the accompanying drawings, forming a part of this specification, and in which—

Figure 1 represents a perspective view of my improved machine; Fig. 2, a longitudinal vertical section of the same, showing the front of the frame elevated.

My invention relates to certain new and useful improvements in the class of machines designed to be drawn over the ground, and in so doing to gather and reduce to short fragments whatever cornstalks or other trash or stubble may be lying thereon; and the invention consists in the novel construction, combination, and arrangement of parts, all as will be hereinafter fully described, and specifically pointed out in the claim.

To enable others skilled in the art to make and use my invention, I will now proceed to describe its construction and operation.

In the drawings, E represents the main frame of the machine, and F F the supporting and drive wheels, mounted upon a transverse shaft, $f$, and upon which said frame E is also journaled or loosely mounted. These wheels are loosely mounted on said shaft, and are provided on their inner or facing sides with pivoted spring-pawls $a$, adapted to engage with ratchet-wheels $b\ b$, securely mounted on said shaft, for the purpose of communicating motion to said shaft from the drive-wheels. Centrally mounted on said shaft $f$ is a large gear-wheel, G, which meshes with a pinion, $g$, mounted on a shaft carrying a large gear-wheel, $h$, which meshes with a small pinion, $d$, mounted on a transverse shaft carrying a series of circular saws, A, and through the medium of which a revolving movement is imparted to the shaft carrying the saws A.

B represents a series of slotted teeth or fingers rigidly secured to the frame-work of the machine, and in which the saws A revolve. These teeth or fingers project forward of the saws in nearly a horizontal plane, and will lift the stalks to the cutting-saws and give them a solid base to rest upon while being cut.

$n$ represents a lever connected to the draft pole or tongue and extending backward within reach of the operator's seat, and through the medium of which the front of the frame E can be raised or lowered to bring the teeth in close proximity to the ground when the machine is in operation, as shown in Fig. 1.

The operation of my improved machine is as follows: As the machine is drawn over the ground motion is imparted to the saws through the medium of the drive-wheels and the intermediate gearing above described, the teeth or fingers lifting the stalks from off the ground and presenting them to the revolving saws, which will reduce them to short fragments.

By throwing the pawls $a$ out of engagement with the ratchet-wheels $b$ the drive-wheels will revolve loosely on the shaft $f$, and thereby prevent the saws from revolving when driving the machine from one field to the other, or when transporting the machine.

Having thus fully described my invention, I do not wish to be understood as claiming, broadly, a series of revolving cutters and lifting-fingers, as I am aware that it is common in this class of machines; but

What I claim as new, and desire to secure by Letters Patent, is—

In a stalk-cutter, the combination, with the drive-wheels and axle, of the main frame journaled on said axle, and the operating-lever $m$, ratchet-wheels $b\ b$, and spring-pawls $a\ a$, large gear-wheel G, pinion $g$, large gear-wheel $h$, transverse shaft carrying small pinion $d$, and a series of vertical saws, A, and the series of slotted and rigid fingers B, through which said saws work, the several parts constructed and relatively arranged to operate substantially in the manner herein shown and described.

ANDREW NELSON ARMSTRONG.

Witnesses:
JOHN TRAINER,
HENRY P. CROWL.